(12) United States Patent
Sirtori et al.

(10) Patent No.: US 6,453,263 B1
(45) Date of Patent: Sep. 17, 2002

(54) SURFACE ANALYSIS USING ELLIPSOMETRY

(75) Inventors: Vittorio Sirtori, Milan; Lorenza Lombardi, Lissone; Michele Monopoli; Franco Zambon, both of Milan, all of (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,941

(22) Filed: Apr. 13, 2000

(30) Foreign Application Priority Data

Jul. 14, 1999 (GB) .............................................. 9916485

(51) Int. Cl.⁷ .............................................. G01B 13/02
(52) U.S. Cl. .................. 702/170; 250/307; 250/339.11; 356/364; 356/369; 356/600; 382/154; 427/53.1
(58) Field of Search ................................. 702/159, 170, 702/171, 172; 250/306, 307; 356/364, 369, 382

(56) References Cited

U.S. PATENT DOCUMENTS

| | | | | |
|---|---|---|---|---|
| 4,590,091 A | * | 5/1986 | Rogers et al. .............. | 427/53.1 |
| 5,333,052 A | * | 7/1994 | Finarov ...................... | 356/369 |
| 5,406,082 A | * | 4/1995 | Pearson et al. .......... | 250/339.11 |
| 5,508,945 A | * | 4/1996 | Mizoh et al. ................ | 702/170 |
| 5,929,994 A | * | 7/1999 | Lee et al. .................... | 356/364 |
| 6,064,759 A | * | 5/2000 | Buckley et al. ............. | 382/154 |
| 6,288,392 B1 | * | 9/2001 | Abbott et al. ................ | 250/307 |
| 2001/0013935 A1 | * | 8/2001 | Watanabe et al. ........... | 356/600 |

FOREIGN PATENT DOCUMENTS

| | | | | |
|---|---|---|---|---|
| GB | 2335982 | 10/1999 | .......... | G01N/21/88 |
| JP | 6163662 A | 6/1994 | ........... | H01L/21/66 |

OTHER PUBLICATIONS

J.A. DiGirolamo, "Surface roughness sensitivity of aluminum wire bonding of chip on board applications", ITL, 1989.

S. Schneuwly et al., "Influence of surface contamination on metal/metal bond contact quality", Journal of Electronic Materials, 27(8), p. 990, 1997.

J. Krzanowski et al., "The effects of thin film structure and properties on gold ball bonding", Journal of Electronic Materials, 27 (11), p. 1211, 1998.

M. Souma et al., "Bonding quality evaluation technology for semiconductor packages", New Tech. Rep. 60 Sep. 1998, p. 58.

R.M.A. Azzam and N.M. Bashara, Ellipsometry and polarized light, North–Holland, pp. 279–280 & 428–452, 1987.

K. Riedling, "Ellipsometry for industrial application", Springler–Verlag, pp. 12–13, 1988.

V.S. Bursic et al., "MANCO TITOLO", J. Vac. Sci. Technol., A8 (3), 2417, 1990.

* cited by examiner

*Primary Examiner*—John S. Hilten
*Assistant Examiner*—John Le
(74) *Attorney, Agent, or Firm*—Lawrence R. Fraley

(57) ABSTRACT

A method and system for estimating the roughness and the contamination of a surface. A preferred embodiment of the present invention makes use of a mathematical model which gives indications of the metal roughness, expressed as the ratio of metal volume to air volume, and the contamination thickness values of a metal substrate (e.g. gold) for a determined contamination (e.g. organic). This model is based on a series of tables which represent the expected values of $\psi$, i.e. the ratio between the amplitudes of the incident beam on the two polarization planes multiplied by the ratio of the amplitudes of the reflected beam on the polarization planes, and $\Delta$, i.e. the difference between the phases on the two polarization planes of the incident beam and the reflected beam, for a gold substrate having a predetermined roughness and a predetermined type of contamination (organic). Each table is built for a roughness value $\phi$ expressed as the ratio of metal volume to air volume and gives the values of $\psi$ and $\Delta$ for a range of possible contaminations expressed as thickness of the contaminant film. Each table shows, for a predetermined value of $\phi$, the expected values of $\psi$ and $\Delta$ for an organic contaminant film having a thickness of 0, 10 . . . 100 Angstrom.

7 Claims, No Drawings

SURFACE ANALYSIS USING ELLIPSOMETRY

TECHNICAL FIELD

The present invention relates to a method for analyzing the characteristics of a surface using ellipsometry, and more particularly a method for estimating the roughness and the contamination of a surface, e.g. a gold surface.

BACKGROUND OF THE INVENTION

In the manufacturing of electronic card once the chip (or the chips in the case of Multi Chip Modules) is mounted on the substrate (e.g. organic or ceramic) it must be electrically connected to the circuits on the substrate (e.g. a printed circuit). The connection is usually done by means of very thin gold wires which are connected to gold pads on the substrate. This operation is called wire bonding and it usually consists of applying a reciprocal pressure and an ultrasonic vibration to the gold wire and the gold pad surface. Due to this operation the two gold surfaces penetrate one another with a "diffusion" of some of the surface layer atoms which move from one surface to the other. The above described wire bonding may be adversely effected by the condition of the two gold surfaces, which should ideally be as flat and clean as possible. Any roughness or contamination of the surfaces should be avoided, otherwise these may result in a poor bonding strength.

The roughness of the surfaces reduces the actual contact area, while an unwanted contamination (e.g. carbon) of the gold surfaces could act as a barrier to the movement of the gold atoms. The surface roughness $\phi$ (i.e. the surface irregularity) could be mathematically expressed as the ratio between the volume occupied by the metal on the surface with respect to the volume occupied by air:

$$\phi = V_{metal}/(V_{metal}+V_{air}) \qquad (1)$$

The contamination may be caused by environmental pollution or by chemical deposited on the pads during the substrate manufacture.

The influence of surface roughness and contamination on metal/metal wire bonding is well known in literature: see as an example J. A. DiGirolamo, "Surface roughness sensitivity of aluminium wire bonding of chip on board applications", ITL, 1989; or A. Schneuwly et al., "Influence of surface contamination on metal/metal bond contact quality", Journal of Electronic Materials, 27(8), p. 990, 1997; or J. Krzanowski et al., "The effects of thin film structure and properties on gold ball bonding", Journal of Electronic Materials, 27(11), p. 1211, 1998; or M. Souma et al., "Bonding quality evaluation technology for semiconductor packages", New Tech. Rep., 60 September, p. 58, 1998.

Given the problems that a bad wire bonding can cause to the electronic card, it is often required that the metal (e.g. gold) surface characteristics are checked before the bonding operations.

Many analytical techniques are known in the art, which can be used to inspect the metal (e.g. gold) surfaces in order to measure carbon contamination thickness and roughness before they undergo the wire bonding process.

The most common method for estimating the surface roughness is by analyzing the surface with highly precise instruments like an Atomic Force Microscope (AFM) or an Interferometer. The surface contamination (particularly the presence of carbon particles) can be detected with X-ray Photoelectron Spectroscopy (XPS), Auger Spectroscopy (AUGER), Secondary Ion Mass Spectroscopy (SIMS) or Ellipsometry.

Instruments like AFM and Interferometer inspect the surface morphology by measuring the distance from the probe to peaks and valleys.

The waves of the light incident on the surface change their amplitude according to the distance from the light source to the surface height: an Interferometer is capable of correlating this change with the surface height.

The interaction between the surface atoms and the instrument probe, that can operate in contact or no contact mode, generates the so called Van Der Walls forces that cause a deflection of the probe; the deflection, being proportional to the atom-probe distance, makes it possible to obtain the surface morphology with the aid of an AFM.

In the above cases the calculation of the percentage of the volume occupied by the metal (e.g. gold) on the analyzed surface is performed according to the following equation:

$$\phi = V_{metal}/V_{total} \qquad (2)$$

where:

$V_{metal}$=the metal volume calculated as the summation of every volume unit given by: ((the minimum value of all the valleys)+(the Mean Height of every Unit Area))×(every correlative Unit Area)

$V_{total}$=(Surface Area)×((Mean height)+(RMS roughness)).

Of course $V_{total}=V_{metal}+V_{air}$.

Mean Height is the average value of all the distances measured from peaks to valleys on the surface RMS=The square root of the average of the squares of the differences between Mean Height and the height of every peak. Surface Area is the real size of the region analyzed and it is calculated by the addition of all the Unit Areas. Unit Area is the double value of the surface corresponding to the triangle connecting the three nearest neighbour data points. The surface or 'real' area depends on the roughness and it is different of course from the 'apparent' area, that is the macroscopic dimension of the sample.

XPS, AUGER and SIMS are very sensitive analytical techniques, that use sophisticated instruments to detect very thin layers (down to one nanometer) of surface films. These instruments are equipped with a source of particles that irradiates the sample and a detector that analyzes the energy of the particles emitted from the sample. The energy of the emitted particles depends on the energy of the incident particle and the bonding energy of the particle in the surface atoms, because of the energy transfer from the incident particle to the atom present on the surface. It is possible by these techniques identifying which elements are present on the surface, their chemical bonding and atomic percentage. These instruments are also provided with a sputtering system that etches layer by layer, with a resolution of few Angstrom, the surface of the sample, and gives the depth profile concentration for every element. Each technique uses a particular source for bombarding the sample and a detector to measure the energy of the particles emitted from its surface:

XPS irradiates the sample with X-ray photons and detects the electrons;

AUGER source irradiates electrons and detects electrons;

SIMS bombards the sample with atoms or ions and analyzes the emitted ions (secondary).

All the above described methods of the prior art have the drawback to be very complex and slow. Furthermore the In instruments required are very expensive. it is known in the art to use ellipsometry to detect the surface contamination of metal, e.g. see R. M. A. Azzam and N. M. Bashara, "Ellipsometry and polarized light", North-Holland, 1987; or K. Riedling, "Ellipsometry for industrial application", Springler-Verlag, 1988; or V. S. Brusic et al., "MANCA TITOLO", J. Vac. Sci. Technol., A8(3), 2417, 1990.

Ellipsometry represents for some applications a good alternative to XPS, AUGER and SIMS. It is a cheap and fast technique, used widely for measuring the thickness of films present on metal or semiconductor surface. Ellipsometry is based on the fact that a monochromatic electromagnetic wave changes its intensity and state of polarization if it strikes non-perpendicularly the interface between two dielectric media, that is represented by a substrate coated with a film. The ellipsometer polarizes linearly the light beam before it strikes the sample surface; linearly (or circular polarization) means that the light gets only two perpendicular components having the same amplitude. The beam, after going through the interface between the surface film and substrate, is reflected and it changes its polarization, i.e. both the ratio amplitude of the two components $\psi$ and their phase $\Delta$ are modified. The two components of the reflected light are no longer mutually perpendicular and have a different amplitude; this is the reason why the polarization becomes elliptical and the technique is called ellipsometry. The ellipsometer measures the experimental values of. the two components of the reflected light, giving the value $\psi$ and $\Delta$. The first is calculated by multiplying the ratio of amplitudes of the incident beam by the amplitudes of the reflected beam; the value $\Delta$ comes from the difference of their phases.

The main purpose of ellipsometry inspection according to the prior art methods is to measure the thickness of oxide and organics films present on low absorbing light substrates. The roughness is considered a 'disturb' for ellipsometry and many mathematical models have been developed to correct the measurement errors induced by roughness.

The above described ellipsometry inspection of the prior art does not give useful indication of the roughness of the analyzed surface. In general none of the above techniques is capable to measure contemporarily roughness and contamination.

SUMMARY OF THE INVENTION

It is an object of the present invention to alleviate the above drawbacks of the prior art.

According to the present invention, we provide a method for analyzing the characteristics of a surface coated by a contaminant film, the method comprising the steps of:

calculating, for a plurality of predetermined values of the surface roughness $\phi$ and for a plurality of predetermined thickness T of contaminant film, the expected values of the ratio $\psi$ between the amplitudes on the two polarization planes of a beam $b_i$ incident on said surface multiplied by the ratio of the amplitudes of the reflected beam $b_r$ on the two polarization planes, and the value of the difference $\Delta$ between the phases on the two polarization planes of the incident beam $b_i$ and the reflected beam $b_r$;

measuring the value of $\psi$ and $\Delta$ of a surface;

determining the value of $\phi$ and T for that surface by comparison with the plurality of expected values.

Various embodiments of the invention will now be described in detail by way of examples.

DETAILED DESCRIPTION OF THE PREFERRED EMBODIMENT

A preferred embodiment of the present invention makes use of a mathematical model which gives indications of the metal roughness, expressed as the ratio of metal volume to air volume, and the contamination thickness values of a metal substrate (e.g. gold) for a determined contamination (e.g. organic). This model is based on a series of tables which represent the expected values of $\psi$, i.e. the ratio between the amplitudes of the incident beam on the two polarization planes multiplied by the ratio of the amplitudes of the reflected beam on the polarization planes, and $\Delta$, i.e. the difference between the phases on the two polarization planes of the incident beam and the reflected beam, for a gold substrate having a predetermined roughness and a predetermined type of contamination (organic). Each table is built for a roughness value $\phi$ expressed as the ratio of metal volume to air volume and gives the values of $\psi$ and $\Delta$ for a range of possible IS contaminations expressed as thickness of the contaminant film. Tables A, B, C and D below are an example. Each table shows, for a predetermined value of $\psi$, the expected values of $\psi$ and $\Delta$ for an organic contaminant film having a thickness of 0, 10 . . . 100 Angstrom. Table A gives the values of $\psi$ and $\Delta$ for an ideal gold surface with no roughness ($\phi$=1). Tables B, C and D represent gold surfaces having $\phi$ respectively equal to 0.9, 0.8 and 0.7.

TABLE A

| $n_s = 0.35$ | $k_s = 2.45$ | |
|---|---|---|
| thk | $\psi_{calc}$ | $\Delta_{calc}$ |
| 0 | 41.4436 | 91.3184 |
| 10 | 41.4950 | 90.4679 |
| 20 | 41.5460 | 89.6345 |
| 30 | 41.5968 | 88.8181 |
| 40 | 41.6472 | 88.0187 |
| 50 | 41.6973 | 87.2362 |
| 60 | 41.7471 | 86.4707 |
| 70 | 41.7967 | 85.7220 |
| 80 | 41.8459 | 84.9903 |
| 90 | 41.8949 | 84.2755 |
| 100 | 41.9436 | 83.5776 |

TABLE B

| $\phi = 0.9$ | | |
|---|---|---|
| $n_s = 0.49$ | $k_s = 2.66$ | |
| thk | $Y_{calc}$ | $D_{calc}$ |
| 0 | 40.358 | 95.816 |
| 10 | 40.419 | 93.840 |
| 20 | 40.484 | 91.898 |
| 30 | 40.551 | 89.991 |
| 40 | 40.623 | 88.121 |
| 50 | 40.699 | 86.290 |
| 60 | 40.78 | 84.502 |
| 70 | 40.866 | 82.758 |
| 80 | 40.958 | 81.062 |
| 90 | 41.057 | 79.417 |
| 100 | 41.164 | 77.828 |

TABLE C

| $\phi = 0.8$ | | |
|---|---|---|
| $n_s = 0.76$ | $k_s = 2.97$ | |
| thk | $\psi_{calc}$ | $\Delta_{calc}$ |
| 0 | 38.600 | 102.34 |
| 10 | 38.673 | 100.28 |
| 20 | 38.749 | 98.245 |
| 30 | 38.829 | 96.239 |
| 40 | 38.913 | 94.266 |
| 50 | 39.002 | 92.326 |
| 60 | 39.095 | 90.421 |
| 70 | 39.194 | 88.554 |
| 80 | 39.299 | 86.726 |
| 90 | 39.411 | 84.94 |
| 100 | 39.531 | 83.198 |

TABLE D

| φ = 0.7 n_s = 1.4 | k_s = 3.35 | |
|---|---|---|
| thk | ψ_calc | Δ_calc |
| 0 | 35.014 | 111.81 |
| 10 | 35.105 | 109.62 |
| 20 | 35.200 | 107.46 |
| 30 | 35.299 | 105.33 |
| 40 | 35.403 | 103.22 |
| 50 | 35.513 | 101.14 |
| 60 | 35.627 | 99.080 |
| 70 | 35.747 | 97.054 |
| 80 | 35.873 | 95.057 |
| 90 | 36.006 | 93.093 |
| 100 | 36.147 | 91.161 |

For more precise estimates a table should be built for shorter regular intervals of value φ representing the surface roughness E.g. a table could be built for each 0.01 of value φ between 0.7 and 1.

From the table it can be noted that the value of ψ is strictly related to the roughness φ, while the value of Δ is more dependent on the contaminant film thickness.

According to a preferred embodiment of the present invention an ellipsometry inspection is performed on the metal surface (e.g. gold) with a Gaertner L106B ellipsometer, equipped with a Helium Neon laser having wavelength of 6328 Angstrom and a spot size of 30 micron.

The analyses were performed setting the angle of incident beam at 70 degrees.

The ψ and Δ values detected with the above described ellipsometry inspection are then compared with the expected values for ψ and Δ according to the tables above to estimate the roughness φ (i.e. which table) and the contamination (i.e. which row on that table). Of course, the shorter the interval of the value φ between the tables, the more precise will be the estimate.

According to a preferred embodiment of the present invention, the above mentioned model, i.e. the tables with the expected values for ψ and Δ, is built using the Fresnel law:

$$tang\psi = |r_p|/|r_s| \text{ and } \Delta = \delta_{rp} - \delta_{rs} \quad (3)$$

where $$r_p = E_{rp}/E_{ip}, \ r_s = E_{rs}/E_{is} \text{ and } \delta_{rp} = \phi_{rp} - \phi_{ip}, \ \delta_{rs} = \phi_{is} - \phi_{rs}$$

$E_{rp}$=Amplitude of reflected beam in the plane of incidence p $E_{ip}$=Amplitude of incident beam in the plane of incidence p $E_{rs}$=Amplitude of the reflected beam in the plane s perpendicular to incidence $E_{is}$=Amplitude of incident beam in the plane s perpendicular to incidence $\phi_{rp}$=Phase of reflected beam in the plane of incidence p $\phi_{ip}$=Phase of incident beam in the plane of incidence p $\phi_{is}$=Phase of incident beam in the plane s perpendicular to incidence $\phi_{rs}$=Phase of reflected beam in the plane s perpendicular to incidence The amplitude and phase values of the reflected beam are affected by the characteristic of the reflecting surface and in particular by two parameters: the refractive index n and the extinction coefficient k, which can be combined together to give the complex refractive index N, defined as: N=n−ik, being 'i' the imaginary number.

When the surface to be analyzed is a substrate (e.g. a gold substrate) covered by a contaminant film (e.g. an organic film) the n and k parameters of both substrate and film must be taken into account. We will call $n_s$ and $k_s$ respectively the refractive index and the extinction coefficient of the substrate to be analyzed and $n_f$ and $k_f$ the refractive index and the extinction coefficient of the contaminant film.

Those skilled in the art will appreciate that the values of ψ and Δ can be obtained with the Fresnel law cited above, using the values of the refractive index $n_s$ and the extinction coefficient $k_s$ of the substrate to be analyzed and the refractive index $n_f$ and the extinction coefficient $k_f$ of the contaminant film. In the present example we assume that the surface to be analyzed is a gold substrate and $n_f$ and $k_f$ are constant and equal respectively to 2.5 and 0. These $n_f$ and $k_f$ are the values corresponding to an organic film, contaminant the gold substrate.

The values of $n_s$ and $k_s$ for the "pure" gold (i.e. with no roughness) can be found in the literature (e.g. see R. M. A. Azzam and N. M. Bashara, "Ellipsometry and polarized light", North-Holland, 1987). We will call the refractive index for the "pure" gold $n_{s0}$ and the extinction coefficient for the "pure" gold $k_{s0}$.

Using the following values in the Fresnel law $n_{s0}$=0.35
$k_{s0}$=2.45
$n_f$=2.5
$k_f$=0 we can easily obtain the table A which represents the values of ψ and Δ for an ideal gold surface with no roughness (i.e. φ=1), contaminated by an organic films of an increasing thickness (from 0 to 100 Angstrom or 0 to 10 nanometer).

As mentioned above, we need a similar table for each If different value of φ. According to our example above, we have a table at every 0.1 interval of φ, but it should be obvious that the shorter the interval the better the result. According to a preferred embodiment of the present invention an interval of 0.01 has been used, but for simplicity the present example only shows a table every 0.1.

The values $n_s$ and $k_s$ for the rough gold surface must be calculated. According to a preferred embodiment of the present invention these values are obtained in the following way:

As mentioned above:

$$V_{total} = V_{metal} + V_{air}$$

and $$\phi = V_{metal}/V_{total}$$

from Clausius-Mossotti the polarizability P is given by:

$$P = (1-\phi) \times [(\epsilon_{Ar}-1)/(\epsilon_{Ar}+2)]_{air} + \phi \times [(\epsilon_{Mr}+2)]_{metal},$$

being $\epsilon_{Ar}$ and $\epsilon_{Mr}$ respectively the relative dielectric constant of the air and the metal.

Because for air $\epsilon_{Ar}$=1, only metal contributes to the polarizability P:

$$P = \phi \times [(\epsilon_{Mr}-1)/(\epsilon Mr+2)]_{metal}.$$

Thanks to Maxwell and Garnett laws the polarizability becomes:

$$P = \phi \times (N^2_{metal}-1)/(N^2_{metal}+2) = (N^2-1)/(N^2+2) \quad (4)$$

where $N_{metal} = ns_0 - iks_0$ is the complex refractive index of the pure metal, without roughness, and N is the effective complex refractive index due to the roughness.

The parameter N, that is the complex index of the metal in presence of roughness, is calculated from equation (4) for every $\phi$. $n_s$ and $k_s$ for every value of $\phi$ are derived by N.

Using the Fresnel law (3) with the optical constants $n_s$ and $k_s$ relative to a specific gold percentage volume $\phi$, it is possible to calculate the variation of $\psi$ and $\Delta$ to the contaminant film thickness.

As explained above an ellipsometry inspection is then performed on a surface (e.g. a gold pad with an expected organic contamination) and experimental values $\psi_{exp}$ and $\Delta_{exp}$ are obtained. According to a preferred embodiment of the present invention these experimental values are then it. compared with the previously calculated tables described above to see which table and which row in the table give the better match with the experimental values. The corresponding table gives an estimate of the roughness in terms of $\phi$, while the matching row gives an estimate of the contamination in terms of thickness of the contaminant film.

With reference to the tables A, B, C and D, as an example suppose we do an ellipsometry inspection on a gold surface where we expect an organic contaminant film, using the equipment described above and obtain the following value for $\psi$ and $\Delta$:

$\psi_{exp} = 40.62$ $\Delta_{exp} = 88.12$

It is easy to identify on the table B, the best approximation to this pair of values, precisely at the line corresponding to 40. This means that the analyzed surface has a roughness $\phi$ corresponding to 0.9 and a contaminant film having the thickness of 40 Angstrom.

Using the method described above is then possible to contemporarily have a very close measure of the roughness and the contamination of a surface in an easy, fast and inexpensive way. The results obtained with the above described method have been compared to the results obtained by the sophisticated, slow and expensive machinery of the prior art and are very close. Furthermore none of the known methods gives useful indications of both roughness and contamination with a single inspection.

The method according to the present invention has been described for a gold surface. The tables given in the example were built for a gold surface having organic contamination, because this is believed to be the most common case, particularly in the electronic card manufacturing industry. However, changing the value of the coefficient of the refractive index $n_f$ and of extinction coefficient $k_f$ it would be easily possible to build similar tables for different kind of contaminant films (e.g. oxide). It is also possible to use the same method for different substrates (i.e. other than gold). However it is a strict requirement that the surface is made of a material having stable characteristics, i.e. materials which do not change their chemical and physical characteristics during the time under environmental conditions. Non-changing substrates include other inert metals, like platinum and nickel and stable oxides, like silicon dioxide and nickel oxide.

What is claimed is:

1. A method for analyzing the characteristics of a surface coated by a contaminant film, the method comprising the steps of:

calculating, for a plurality of predetermined values of surface roughness $\phi$ and for a plurality of predetermined thickness T of contaminant film, the expected values of the ratio $\psi$ between the amplitudes on the two polarization planes of a beam $b_i$ incident on said surface multiplied by the ratio of the amplitudes of the reflected beam $b_r$ on the two polarization planes, and the value of the difference $\Delta$ between the phases on the two polarization planes of the incident beam $b_i$ and the reflected beam $b_r$, said expected values being organized in a plurality of tables each relating to a predetermined value of surface roughness $\phi$ and further relating to a predetermined value of thickness T of contaminant film;

measuring the value of $\psi$ and $\Delta$ of a surface;

determining the value of $\phi$ and T for that surface by comparison with the plurality of expected values.

2. The method of claim 1 wherein said measuring step is performed with an ellipsometer.

3. The method of claim 1 wherein the contaminant film is organic.

4. The method of claim 1 wherein the surface is an inert metal.

5. The method of claim 4 wherein the inert metal is gold.

6. The method of claim 1 wherein the values of $\psi$ and $\Delta$ of each of said plurality of tables depend on the value of the refractive index $n_s$ and the extinction coefficient $k_s$ for the surface material and for the predetermined value of f of said table.

7. A computer program product comprising computer program code means stored on a computer readable storage medium for, when executed on a computing device, implementing the method of claim 1.

* * * * *